US00RE35207E

United States Patent [19]

Daniels

[11] E Patent Number: Re. 35,207

[45] Reissued Date of Patent: Apr. 16, 1996

[54] METHOD OF AND MEANS FOR DISPENSING SHOPPING BAGS FROM DIFFERENT SIZE BAG PACKS

[75] Inventor: Mark E. Daniels, Redondo Beach, Calif.

[73] Assignee: The Avantage Group, Inc., Redondo Beach, Calif.

[21] Appl. No.: 326,724

[22] Filed: Oct. 20, 1994

Related U.S. Patent Documents

Reissue of:

[64] Patent No.: 5,205,435
Issued: Apr. 27, 1993
Appl. No.: 871,856
Filed: Apr. 21, 1992

[51] Int. Cl.[6] ..... A47K 10/24

[52] U.S. Cl. ..... 221/44; 206/554

[58] Field of Search ..... 221/1, 44, 33; 206/806, 554

[56] References Cited

U.S. PATENT DOCUMENTS

| | | | |
|---|---|---|---|
| 3,454,166 | 7/1969 | Dinges | 211/57.1 |
| 4,676,378 | 6/1987 | Baxley et al. | 206/554 |
| 5,335,788 | 8/1994 | Beasley et al. | 206/554 |

*Primary Examiner*—Kenneth Noland
*Attorney, Agent, or Firm*—Beehler & Pavitt

[57] ABSTRACT

A method and means for dispensing plastic T-shirt type shopping bags which are in several different packs, each pack having bags of the same size, but different packs having bags of different sizes, the means comprising a rack having a supported transverse bar behind and below which are provided, for example, three downwardly extending hooking elements spaced from each other and centrally aligned with the bar. The bags of the smallest size are hooked over the uppermost hooking element by their central detachable upper edge closures, and brought up and draped over the mounting plate in reverse position. The bags of the next larger size are hooked over the next lower hooking element and brought up over the mounting plate and draped over the smallest bags. Similarly, the bags of the next larger size bag pack are hooked on the next lower hooking element and draped in reverse position over the second pack of bags. The bags are then folded forward from their reverse positions over a transverse bar to cause them to hang downwardly over and parallel to the bags of the largest bag pack in front of the hooking elements. A large part of their lower portions is draped over the transverse bar. Removal of a bag of any size is accomplished by grasping the top downwardly hanging bag of the desired size and pulling it out from the draped bags and detaching it from its closure over the hooking element.

6 Claims, 1 Drawing Sheet

METHOD OF AND MEANS FOR DISPENSING SHOPPING BAGS FROM DIFFERENT SIZE BAG PACKS

Matter enclosed in heavy brackets [ ] appears in the original patent but forms no part of this reissue specification; matter printed in italics indicates the additions made by reissue.

FIELD OF THE INVENTION

This invention relates to the field of plastic shopping bags and the dispensing of what are known as "T-shirt style merchandising bags" which are made available in packs of identical size bags in boxes or otherwise provided with one bag on top of the others. It also relates to plastic shopping bags which are known as "merchandise bags on headers," which also are available in the same forms as "T-shirt style merchandising bags".

BACKGROUND OF THE INVENTION

In recent years, plastic merchandise bags have largely supplanted paper bags in retail stores. Among the reasons for this development are the fact that plastic bags are cheaper, easier to handle, to ship and to store, are more easily recycled and may be readily provided in a plurality of different sizes for the convenience of retailers who may be selling merchandise of many different sizes and configurations which they may often desire to hand to the customer at the time of sale in a shopping bag of a size most suitable to encompass the particular item or items of merchandise.

Among the more popular types of plastic bags are what have been termed "T-shirt" style merchandising bags. These may be provided by plastic bag manufacturers, either in rolls, or in a series of interconnected bags blocked/—on/ headers, or in packs in which bags of identical size and configuration are placed one upon another and may be shipped to the retailer in boxes or plastic or other wrappings. The present invention involves the dispensing of the latter types of bag packages i.e., those not shipped to the retailer in rolls.

The T-shirt type bag in the non-rolled shipped form comprises a pair of side panels which are connected along their side and bottom edges to define a cavity adapted to receive articles. Each side of the bag towards its upper area is provided with a pair of straps spaced apart from each other. The straps of the two sides of the panels are joined together along their upper edges and may be open along their side edges, thereby to form two separate handles with open spacing between them above the upper open edges of the bag. These upper edges are not closed except for a small center area where the two abutting edges are joined by a pair of detachable looped or slotted extensions, known as blocked headers or tabs. These extensions are not only joined together, but they may be joined with the corresponding extensions of adjacent bags, thereby to enable packs of bags to be kept together for handling and mounting on some type of horizontally extending projection which may be passed through the registering loops or slots in the extensions of a bag pack. Examples of such mountings are shown in U.S. Pat. Nos. 4,819,898; 4,840,335; 4,981,216; 4,995,860; and 5,020,750.

Heretofore, as seen from the patents listed above, principal attention has been given primarily to providing a method and means for dispensing bags of a single size, such as those for groceries in supermarkets.

The supermarket racks and techniques, however, are not satisfactory for merchandisers of garments, cosmetics, footwear, household articles, personal items, etc.. A retailer vending any variety of goods ordinarily desires to be able to deposit the customer's purchases in some type of convenient shopping bag—one which is appropriate in size to the size of the item purchased. This renders it desirable for a retailer's cashier or checkout station to have available packs of a plurality of different sizes of bags. However, if each different size bag pack is separately and singly mounted for ripping off and removal by the cashier or other store clerk, not only will considerable space be required, but also it may be necessary for the clerk to waste time and energy moving about to reach the different bag packs. This is not only inconvenient, but may be fatiguing for the clerks. What is desirable, therefore, is some type of rack arrangement whereby a plurality of packs of different size bags may be mounted together for convenient removal by a clerk exerting a minimum of effort and movement in or about his or her work station.

SUMMARY OF THE INVENTION

The present invention provides a convenient and ergonomically efficient system and means for enabling a cashier or store clerk to secure the most desirable size bag appropriate for the size of the particular merchandise which is being paid for at the cashier's or packing clerk station. What is entailed is providing a rack in the form of a transverse bar supported at its ends away from a wall or vertical counter surface behind and below which, centrally disposed with respect to such bar on such wall or vertical counter surface, are a plurality of downwardly extending looking elements spaced apart from each other. The uppermost of these hooking elements is passed through the loop or slot of the center extensions of the pack of the smallest size bags and the bags of this pack are brought up and laid over the transverse mounting plate in a reversed position. Similarly, the hooking element next below the uppermost element is passed through the looped or slotted extensions of the bag pack of the next largest size bag and the bags of the pack are brought up and laid over the smallest size bags on the transverse mounting plate, again in reverse position. One or more additional packs, starting with the next largest in size, is similarly mounted on the hook next below the upper hooks and the bags are brought up over the transverse mounting plate and laid on the preceding smaller size bags in a reverse position. In each instance, when the bags of a pack are folded into their correct position and are brought over the transverse bar, a substantial portion of each bag will be allowed to drop or fall down from the transverse bar. While a single pack my be thus mounted on one of the looks and brought over the bar or as many as four or five different packs may be thus mounted, the ideal number of different size packs would appear to be three or four, although this may vary depending upon the thickness of each pack and the weight of the bags of the packs.

When a plurality of packs of bags have been thus mounted, it will be readily appreciated that the cashier or other store clerk has readily available in one location a reflection of different sized bags. The clerk may then simply lift the top bag of any of the several packs and jerk it across the rod thereby detaching it from its looped or slotted center extension so that it may be slipped out, not only from its own pack, but between such of the other packs of bags which may be laid over its pack. The bag so removed comes over the rod with its straps and open top last, whereupon the clerk may conveniently open the bag and place the articles of merchandise inside it. The two straps of the bag may either be tied, or the bag may be handed to the customer in such a manner that the customer may slip his or her hand or fingers through the ,straps and carry away the purchase.

The rod and its end supports may be formed integrally with means for supporting the several hooked elements; or alternatively, the rods and its supports may be separated from the hook support. Desirably, the hooking elements should be U-shaped heavy wire or rod members secured at both ends to a base with the "U" portion bent downwardly pan way from its end. The hook, however, could take a number of other different forms, such as a V-shape or, even, rectangular. While a bent wire type hook is preferred, the hook could be in the form of a flat metal or plastic element.

It will be appreciated from a consideration of the foregoing and the detailed description with reference to the drawing which hereafter follows that the present invention provides a most convenient and ergonomically effective means and method for mounting and dispensing packs of T-shirt type bags and, particularly, where packs of bags of different sizes may be required.

DESCRIPTION OF THE DRAWINGS

In the accompanying drawings.

DESCRIPTION OF THE PREFERRED EMBODIMENT

Figure 1:
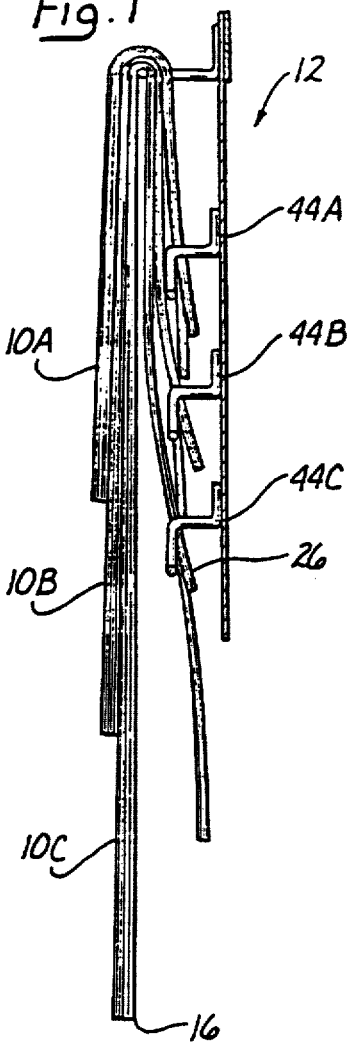
FIG. 1 is a side elevation partly in section, showing a rack with a plurality of packs of bags of different sizes mounted in accordance with the present invention.
Figure 2:
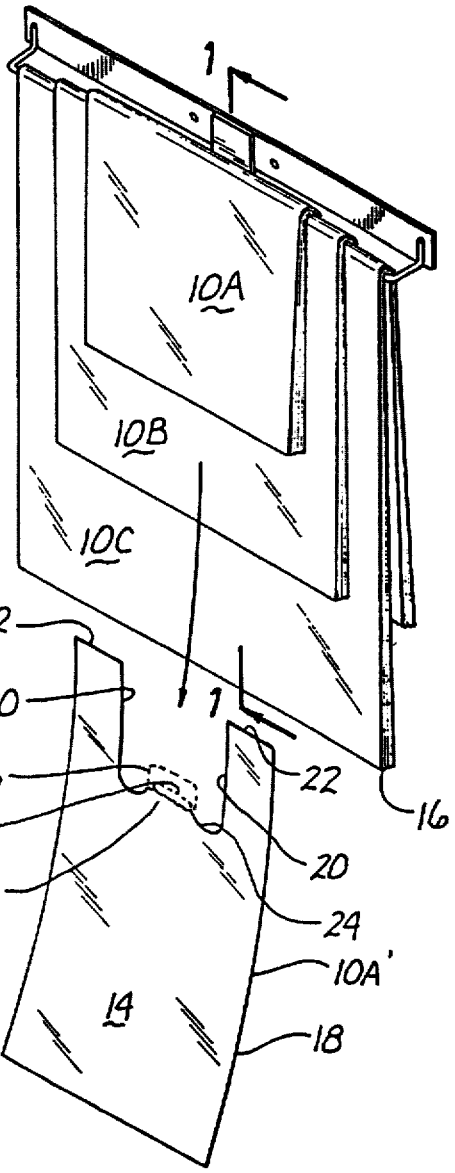
FIG. 2 is a perspective view of a rack holding a plurality of packs of different sizes of T-shirt type bags, and illustrating the removal of one of such bags.

Referring to FIGS. 1 and 2 of the drawing, three different size packs of bags 10A, 10B and 10C are shown mounted on a rack 12. In the example so illustrated, the bags of the pack 10A are smaller than those of pack 10B, 10C, and the bags of the pack 10B are smaller than the bags of the pack 10C. Each individual bag of each of the three packs 10A, 10B and 10C is of the configuration of the bag 10A shown in FIG. 2 after its removal from the pack 10A. as may be observed, each bag in each of the packs comprises a pair of oppositely facing panels 14 joined along their bottoms 16 and side edges 18. The side edges 18 have a pair of upwardly extending strap extensions 20 which are closed along their top edges 22. The upper portion 24 of the panels 14 are open between the straps 20 except for a detachable slotted center closure 26 shown in dotted lines on the removed bag 14 at the bottom of FIG. 2. When packs of bags are produced, the closures 26 not only close a portion of the top edges 24 of the panels 14, but the closures 26 are also secured to the adjacent closures 26 of bags forming the pack. Each closure 26 is fairly easily detachable from the upper edges 24 since the bottom edge of the closure 26 where it joins the center of the edges 24 is perforated. This bag construction is well known and forms no part of the present invention, which is providing the pack 12 and mounting packs of different size bags 10A, 10B and 10C in the manner hereinafter described.

Figure 3:
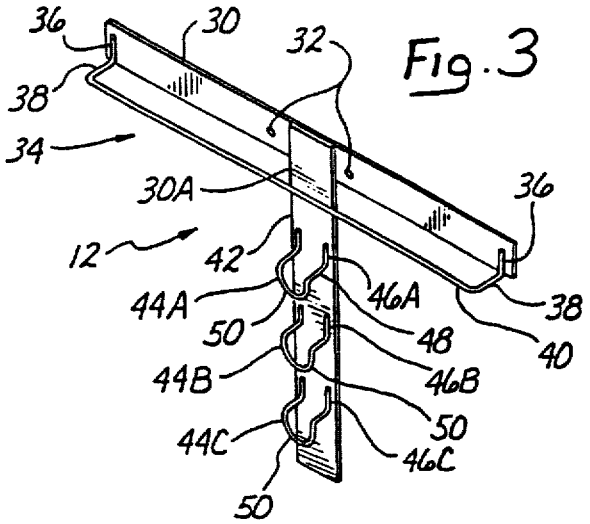
FIG. 3 is a perspective view of the rack of the present invention.
Figure 4:
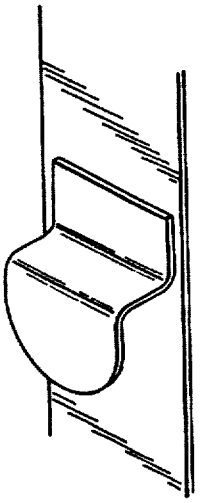
FIG. 4 is an enlarged view of an alternate type of hooking element from that shown in FIGS. 1 and 3.

As best seen in FIG. 3, the rack of the present invention comprises a transverse plate 30 which may be mounted to the wall or any other vertical surface by screws (not shown) which are inserted in holes 32. Welded or otherwise secured to the ends of the plate 30 is a U-shaped member 34 which is bent at its ends once to provide a segment 36 which may be welded or secured to the plate 30, and again to provide an end support 38 for the transverse bar portion 40. Desirably, for convenience, a vertical hook supporting plate 42 may be welded or bolted at the center 30a of the plate 30 to extend downwardly therefrom. The vertical plate 42 serves to carry a plurality of hooking elements 44A, 44B, 44C spaced apart from each other. In the embodiment illustrated, these hooking elements comprise U-shaped wire members bent once, to provide segments 46A, 46B 46C respectively, secured to the vertical plate 42, and outwardly projecting segments 48; and further bent to produce downwardly extending end segments 50. Although 44A, 44B and 44C are shown as formed of rigid bent wires or rods, they could also be formed as the solid plates shown in FIG. 4.

With the rack mounted on a wall, a side of a counter, or some other readily accessible vertical surface, a plurality of packs of bags are then placed over the rack in the following manner:

The strap ends 22 of the smallest bag pack 10A is slipped over the transverse bar portion 40 of the U-shaped member 34 and between that member 40 and the plate 30, and these strap ends 22 are brought down below the hooked element 44A and the hooked element 4A is passed through the slotting 27 in the detachable closures 26 of the bags 10A.. The remainder of the bag pack 10A is then draped over the transverse plate 30 in a reverse position.

The second smaller pack 10B is similarly brought over the transverse bar 40 and hooked on to the hooking element 44B and draped over the bag pack 10A, also in a reverse position.

Similarly, the larger bag pack 10C is hooked on to the hooking element 44C and draped in a reverse position over the portions of the bag packs 10A and 10B which have been draped in a reverse position respectively over the transverse plate 30. When all three packs of bags are hooked as described above, all three packs are then folded over transverse bar 40 so that a large portion of them, is draped over the transverse bar 40. The remainder, or hooked portion, of the bags fits into the gap 38, as shown in FIGS. 1 and 2.

With the three packs thus mounted on the rack 34 and the latter secured to a wall or vertical portion of the counter adjacent the cashier or clerk, the latter is in a position to remove a bag from any of the three different size packs by simply grasping the panel portion 14 of the top bag of any of the three packs 10A, 10B and 10C and pulling it, desirably with a slight jerk, thereby effecting a detachment of the center edge 34 from the closure 26. Because the plastic shopping bags, for the dispensing of which the present invention is directed, have lubricious surfaces, any individual bag thus pulled from a pack, even though that pack may be covered by one or more other packs, e.g. 10B and/or 10A, will be found to be readily removable from the rack 34. As a consequence, the cashier or clerk may most conveniently withdraw from the rack 34 carrying packs of different size bags mounted as shown in FIGS. 1 and 2, an appropriate size bag for enclosing the article or articles arriving at the point of sale.

I claim:

1. A method of providing a suitable sized shopping bag from a plurality of packs of plastic bags, each pack having bags of the same size, but each pack being of a different size bag; each bag of each pack being of the "T-shirt" type having a closed bottom and sides, and side straps closed along their top edges, and an open top between the side straps, said open top being initially partially closed by a detachable slotted piece centrally attached along the edges of the bag defining the open top between the straps, said method comprising:

(a) providing a rack [ with] *comprised of* a [projecting] transverse *plate and a transverse* bar *projecting forward from, parallel to, and spaced from said plate, and mounting said plate for support against a vertical surface*;

(b) providing a plurality of vertically aligned U-shaped members, spaced apart from each other, each member being bent downwardly at an angle, said U-shaped members being aligned centrally with the bar to project below the bar with the uppermost U-shaped member being spaced from, and disposed below the level of the bar;

(*c*) *slipping the side trap ends of a first and smallest bag pack over the transverse bar and down between said bar and the rack plate;*

[(c)] (*d*) hooking the detachable slotted pieces of [a first pack of bags of a predetermined size over one U-shaped member, and the detachable slotted pieces of a second pack of bags of a larger size over another U-shaped member, the slotted pieces of the bags of larger size being hooked over a U-shaped member disposed below the U-shaped member over which the slotted pieces of bags of smaller sizes are hooked;] *the first and smallest pack of bags over the uppermost of the U-shaped members;*

[(d)] (*e*) draping the lower portions of the bags of the first *and smallest* bag pack over the [transverse bar] *rack plate* in a reverse position;

(*f*) *slipping the side strap ends of the next largest and second bag pack over the transverse bar and down between said bar and the rack plate;*

(*g*) *hooking the detachable slotted pieces of said next larger bag pack over the U-shaped member which is next below the uppermost of the U-shaped members;*

[(e)] (*h*) draping the lower portions of the bags of [the larger and second size bag pack in a reverse position over the lower portions of the bags of the first bag pack which latter portions are draped over the transverse plate in a reverse position;] *said next larger and second size bag pack over the rack plate in a reverse position;*

[(f)] (*i*) folding the lower portions of the *two* hooked bag packs [of various sizes] from their reverse positions over the transverse bar forward over the transverse bar to cause said lower portions to hang downwardly over [and parallel to the bags of the third bag pack] *the bar* in front of the U-shaped members; and

[(g)] (*j*) removing a bag from any of the first or second bag packs from the rack and the U-shaped members by grasping a lower portion of the bag draped over the transverse bar or hanging downwardly therefrom, and pulling the bag to detach it from its slotted piece on the U-shaped member on which its said detachable slotted piece is hooked.

2. A method of providing a suitable sized shopping bag from [a plurality of] *three* packs of plastic bags, each pack having bags of the same size but each pack being of a different bag size; each bag of each pack being of the "T-shirt" type having a closed bottom and sides, and side straps closed along their top edges, and an open top between the side straps, said open top being initially partially closed by a detachable slotted piece centrally attached along the edges of the bag defining the open top between the straps, said method comprising:

(a) providing a rack [with] *comprised of* a [projecting] transverse *plate and a transverse* bar *projecting forwardly from, parallel to, and spaced from said plate, and mounting said plate for support against a vertical surface;*

(b) providing [a plurality of] *at least three* vertically aligned U-shaped members, spaced apart from each other, each member being bent downwardly at an angle, said U-shaped members being aligned centrally with the bar to project below the bar with the uppermost U-shaped member being spaced from, and disposed below the level of the bar;

(*c*) *slipping the side strap ends of a first and smallest bag pack over the transverse bar and between said bar and the rack plate;*

[(c)] (*d*) hooking the detachable slotted pieces [of the pack of bags of a first size over one U-shaped member and the detachable slotted pieces of a pack of bags of a second and larger size over another U-shaped member, and the detachable slotted pieces of a third pack of bags of an even larger size than the bags of the second pack, over a further U-shaped member, the slotted pieces of the bags of each larger size being hooked over a U-shaped member disposed below the U-shaped members over which the slotted pieces of bags of smaller size are hooked;] *over the uppermost of the U-shaped members;*

171 (d)] (*e*) draping the lower portions of the bags of the first *and smallest* bag pack over the [transverse bar] *rack plate* in a reverse position;

(*f*) *slipping the side strap ends of the next larger and second bag pack over the transverse bar and between said bar and the rack plate;*

(*g*) *hooking the detachable slotted pieces of said next larger bag pack over the U*-shaped member which is next below the uppermost of the U-shaped members;

[(e)](*h*) draping the lower portions of the bags of the next larger [and second size] bag pack over the [lower portions of the bags of the first bag pack, also] *rack plate* in a reverse position;

(*i*) *slipping the side strap ends of the further next larger and third bag pack over the transverse bar and between said bar and the rack plate;*

(*j*) *hooking the detachable slotted pieces of said third baq pack over the U-shaped member which is the second below the uppermost of the U-shaped members;*

[(g)] (*k*) folding the lower portions of the [hooked bag packs of various sizes] *first and smallest bag pack and the next larger and second bag pack* from their reverse positions over the transverse [bar] *plate* forward over the transverse bar to cause said lower portions to hang downwardly over [and parallel to the bags of the third bag pack] *the bar* in front of the U-shaped members; and

[(h)] (*l*) removing a bag from any of the first, second and third bag packs from the rack and the U-shaped members by grasping a lower portion of the bag draped over the transverse bar or hanging downwardly therefrom, and pulling the bag to detach it from its slotted piece on the U-shaped member on which its said detachable slotted piece is hooked.

3. Rack means for providing a suitable sized shopping bar from a plurality of packs of plastic bags, each pack having bags of the same size, but each pack being of a different bag size; each bag of each pack being of the "T-shirt" type having closed bottom and sides, and side straps closed along their top edges, and an open top between the side straps, said open top being initially partially closed by a detachable slotted piece centrally attached along the edges of the bag defining the open top between the straps, said rack means comprising:

(a) a transverse bar;

(b) means to support said bar at its ends from a vertical wall, or other vertical surface;

(c) means extending vertically downwardly from, and secured to said bar intermediate its ends; and (d) a plurality of hooking members spaced apart from each other, each of stud members being secured to said means extending vertically downwardly from said bar and being aligned centrally with the bar to project below the bar with the uppermost member being spaced from, and disposed below the level of the bar;

whereby the detachable slotted pieces of the pack of bags of one size may be hooked over one member and the slotted pieces of a pack of bags of a different size may be hooked over another member, and each pack of bags may be draped over the transverse bar or over another pack of bags draped over the bar.

4. Rack means for providing a suitable sized shopping bag from a plurality of packs of plastic bags, each pack having bags of the same size, but each pack being of a different bag size; each bag of each pack being of the "T-shirt" type having a closed bottom and sides, and side straps closed along their top edges, and an open top. between the side straps, said open top being initially partially closed by a detachable slotted piece centrally attached along the edges of the bag defining the open top between the straps, said rack means comprising:

(a) a transverse bar;

(b) means to support said bar at its ends from a vertical wall, or other vertical surface;

(c) means extending vertically downwardly below and fixably secured in relation to said bar intermediate its ends; and (d) a plurality of hooking members spaced apart from each other, each of said members being secured to said means extending vertically downwardly from said bar and being aligned centrally with the bar to project below the bar with the uppermost member being spaced below, and disposed below the level of the bar;

whereby the detachable slotted pieces of the pack of bags of one size may be hooked over one member and the slotted pieces of a pack of bags of a different size may be hooked over another member, and each pack of bags may be draped over the transverse bar or over another pack of bags draped over the bar.

5. A method of providing dispensable shaping bags from a pack of plastic bags, each bag of the pack being of the "T-shirt" type having a closed bottom and sides, and side straps closed along [heir] *their* top edges, and an open top between the side straps, said open top being initially partially closed by a detachable slotted piece centrally attached along the edges of the bag defining the open top between the straps, said method comprising:

(a) providing a rack [with a projecting] *comprised of* a transverse *plate and a transverse* bar *projecting forwardly from, parallel to, and spaced from said plate, and mounting said plate for support aqainst a vertical surface;*

(b) providing a U-shaped member, said member being bent downwardly at an angle, said U-shaped member being disposed below the level of the bar and aligned centrally with the bar to project below the bar and spaced from the bar;

(c) hooking the detachable slotted pieces of the pack of bags over the U-shaped member;

(d) draping the lower portions of the [bas] *bags* of the bag pack over the transverse [bar] *plate* in a reverse position;

(e) folding the lower portions of the hooked bag pack from their reverse position over the transverse [bar] *plate* forward over the transverse bar to cause said lower portions to hang downwardly over the bar in front of the U-shaped member; [ad] *and*

(f) removing a [bar] *bag* in the bag pack from the rack and the U-shaped member by grasping a lower portion of the bag draped over the transverse bar and hanging downwardly therefrom, and pulling the bag to detach it from its slotted piece on the U-shaped member on which its said detachable slotted piece is hooked.

6. Rack means for providing dispensable shopping bags from a pack of plastic bags, each bag of the pack being of the "T-shirt" type having a closed bottom and sides, and side straps closed along their top edges, and an open top between the side straps, said open top being initially partially closed by a detachable slotted piece centrally attached along the edges of the bag defining the open top between the straps, said rack means comprising:

(a) a transverse bar;

(b) means to support said bar at its ends from a vertical wall, or other vertical surface;

(c) a hooking member, said member being disposed below the level of the bar and aligned centrally with the bar to project below the bar and being spaced from eh bar;

whereby the detachable slotted pieces of the pack of bags may be hooked over the member, and the pack of bags may be draped over the transverse bar for removal by lifting the uppermost bag on the bar upwardly and pulling it away from the hooking member to detach its detachable slotted piece from the remainder of the bag and free said remainder from the hooking member.

* * * * *